G. CLEMENTS.
VACUUM CLEANER HANDLE.
APPLICATION FILED NOV. 12, 1913.
1,102,000.
Patented June 30, 1914.
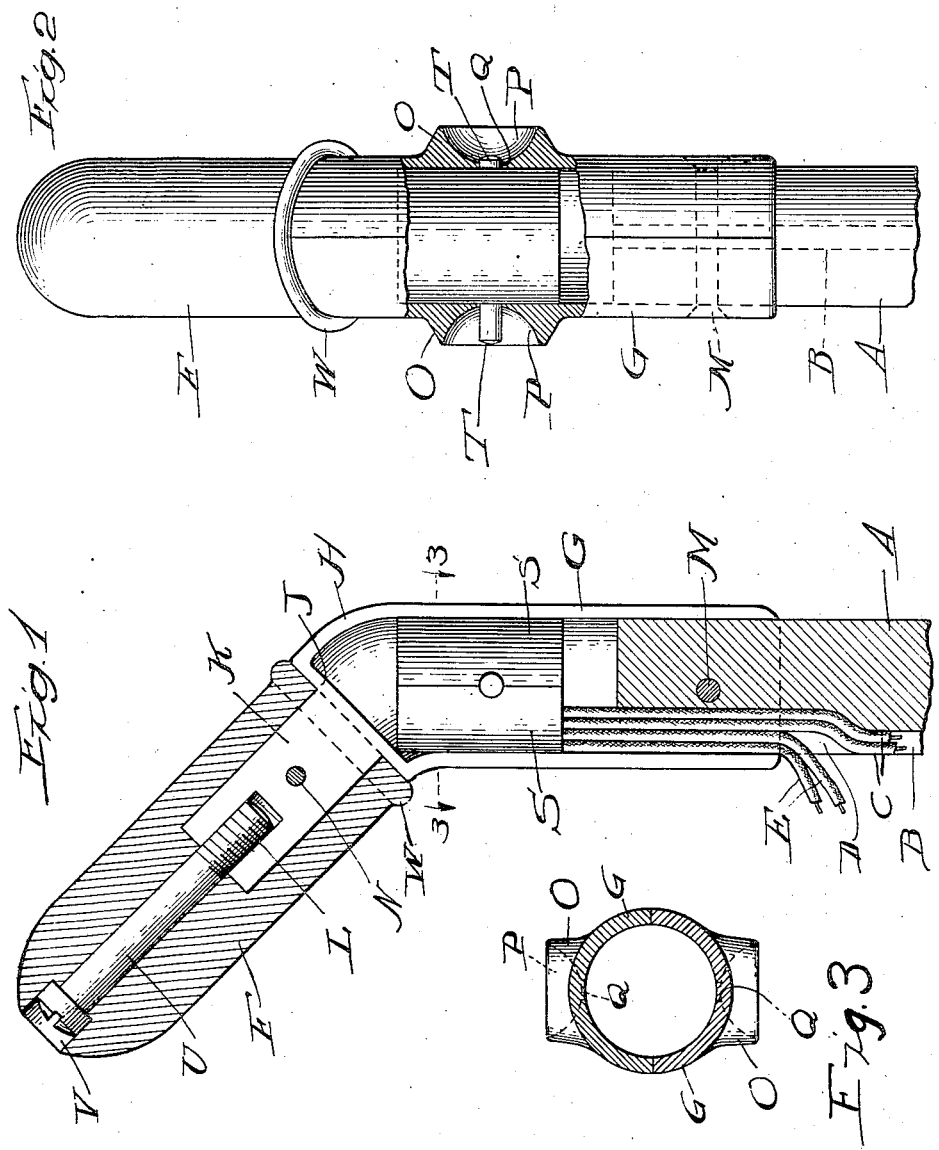

UNITED STATES PATENT OFFICE.

GEORGE CLEMENTS, OF CHICAGO, ILLINOIS.

VACUUM-CLEANER HANDLE.

1,102,000. Specification of Letters Patent. Patented June 30, 1914.

Application filed November 12, 1913. Serial No. 800,454.

*To all whom it may concern:*

Be it known that I, GEORGE CLEMENTS, a citizen of the United States, residing at Chicago, in the county of Cook and State of Illinois, have invented a certain new and useful Improvement in Vacuum-Cleaner Handles, of which the following is a specification.

My invention relates to improvements in vacuum cleaner handles and is illustrated in the accompanying drawings, wherein—

Figure 1 is a longitudinal section; Fig. 2, a plan view of the same with parts broken away; and Fig. 3, a detail cross section along line 3—3 of Fig. 1.

Like parts are indicated by the same letter in all the figures.

A is a handle rod preferably of wood.

B is a groove on the lower side thereof through which the conductors C C for the motor are led.

D is a larger groove in the upper part of the handle to give room for the conductors C C and also for the inleading conductors E E.

F is the handle grip also preferably of wood. The handle grip and handle rod are connected by a casing which comprises the tubular portion G, the curved part H, the end plate J and the projection K hollowed and screw-threaded at its upper end L. The tubular part G is composed of two pieces or halves held together by the transverse bolt M and the handle F and the transverse bolt N. Each of the halves of the part G has a raised portion O with the central depression P and aperture Q. Within this tubular part is the tubular switch casing composed of the parts S S held together by the tubular portion G. Within the switch casing is a switch the thumb pieces T T of which are all that is illustrated. The switch may be of any desired form and the connection between it and the conductors may be made in any desired manner.

U is a screw bolt screw-threaded to engage the screw threads in the part L, and V is a recess in the end of the handle to receive the head of the screw bolt.

W is an ornamental bead on the end of the handle.

It will be understood that this drawing is more or less diagrammatic or at least intended as an illustration of the invention without being intended to limit me to the precise form, proportion and arrangement of the parts, for all this may be considerably altered without departing from the spirit of my invention.

The use and operation of my invention are as follows: Assuming that the switch mechanism has been inserted within the two-part switch case and the two parts brought together so as to allow the thumb pieces T to project, it will be obvious that the switch case with the associated parts could not be inserted in the tubular casing G if the latter were integral. By separating the two parts of this connector casing the switch may be brought into position, its parts T projecting through the holes Q Q in the enlargement of the connector casing. The two separated halves of the connector casing are held in the proper relation, and the handle is brought into position and secured there by the screw bolt. Assuming that the conductors have been properly attached to the switch, the handle A can now be brought into the position indicated and the parts be all permanently attached together by the bolt M.

I have shown the parts in the position indicated, that is with the handle bent with reference to the handle rod, though, of course, the two parts might be straight and in alinement with each other.

I have described my device as a vacuum cleaner handle and it is for this purpose that I intend to use it, but it could be used as a handle with any device where such a handle is required, and it is particularly adapted for any device where an electric motor is mounted on or at the bottom of the handle rod.

I claim:

1. A handle comprising an elongated solid handle rod, a cylindrical hollow casing mounted on and surrounding the end of the handle rod, an electric switch contained within said casing having operating parts which project therethrough, and a grip mounted on said casing projecting forward and rigidly attached thereto, said grip being inclined to the handle rod.

2. A handle comprising an elongated solid handle rod, a cylindrical hollow casing mounted on and surrounding the end of the handle rod, an electric switch contained within said casing having operating parts which project therethrough, and a grip mounted on said casing projecting forward and rigidly attached thereto, said grip being inclined to the handle rod, said casing being made in two parts to permit the introduction of the electric switch and the end of the handle rod.

3. A handle comprising an elongated solid handle rod, a cylindrical hollow casing mounted on and surrounding the end of the handle rod, an electric switch contained within said casing having operating parts which project therethrough, and a grip mounted on said casing projecting forward and rigidly attached thereto, said grip being inclined to the handle rod, said casing having a curved elbow-like extension to which the handle grip is attached.

4. A handle comprising an elongated solid handle rod, a cylindrical hollow casing mounted on and surrounding the end of the handle rod, an electric switch contained within said casing having operating parts which project therethrough, and a grip mounted on said casing projecting forward and rigidly attached thereto, said grip being inclined to the handle rod, said casing having a curved elbow-like extension from which projects a lug surrounded by the handle grip and to which the handle grip is attached.

In testimony whereof, I affix my signature in the presence of two witnesses this 8th day of November, 1913.

GEORGE CLEMENTS.

Witnesses:
MINNIE M. LINDENAU,
MINNIE SUNDFAR.